United States Patent
Hahn et al.

(10) Patent No.: US 8,738,903 B2
(45) Date of Patent: May 27, 2014

(54) METHOD FOR IDENTIFYING MOBILE STATION

(75) Inventors: Gene Beck Hahn, Goyang-si (KR); Ki Seon Ryu, Yongin-si (KR)

(73) Assignee: LG Electronics Inc., Seoul (KR)

( * ) Notice: Subject to any disclaimer, the term of this patent is extended or adjusted under 35 U.S.C. 154(b) by 166 days.

(21) Appl. No.: 13/125,222

(22) PCT Filed: Nov. 3, 2009

(86) PCT No.: PCT/KR2009/006415
§ 371 (c)(1),
(2), (4) Date: Apr. 20, 2011

(87) PCT Pub. No.: WO2010/062056
PCT Pub. Date: Jun. 3, 2010

(65) Prior Publication Data
US 2011/0202760 A1  Aug. 18, 2011

Related U.S. Application Data

(60) Provisional application No. 61/110,911, filed on Nov. 3, 2008.

(30) Foreign Application Priority Data

Feb. 26, 2009  (KR) .................. 10-2009-0016280
Aug. 28, 2009  (KR) .................. 10-2009-0080523

(51) Int. Cl.
*H04W 12/02* (2009.01)
*H04W 12/06* (2009.01)
*H04W 74/00* (2009.01)
*H04W 74/08* (2009.01)

(52) U.S. Cl.
CPC ............ *H04W 12/06* (2013.01); *H04W 74/002* (2013.01); *H04W 74/0833* (2013.01)
USPC .......................................... 713/162

(58) Field of Classification Search
CPC ..................................... H04W 12/06
USPC .......................................... 713/162
See application file for complete search history.

(56) References Cited

U.S. PATENT DOCUMENTS

| | | | |
|---|---|---|---|
| 2007/0055778 A1* | 3/2007 | Park et al. | 709/226 |
| 2007/0293244 A1* | 12/2007 | Lee et al. | 455/456.5 |
| 2008/0089294 A1* | 4/2008 | Shon et al. | 370/331 |
| 2008/0219255 A1* | 9/2008 | Tsai et al. | 370/389 |
| 2009/0019284 A1* | 1/2009 | Cho et al. | 713/170 |

FOREIGN PATENT DOCUMENTS

| | | |
|---|---|---|
| KR | 10-2004-0048049 A | 6/2004 |
| KR | 10-2006-0097572 A | 9/2006 |
| KR | 10-2007-0027405 A | 3/2007 |

* cited by examiner

*Primary Examiner* — Kambiz Zand
*Assistant Examiner* — Aubrey Wyszynski
(74) *Attorney, Agent, or Firm* — Birch, Stewart, Kolasch & Birch, LLP

(57) ABSTRACT

A data transmission and reception method for ensuring privacy and security and a method for identifying a Mobile Station (MS), while ensuring the location privacy of the MS in a wireless access system are disclosed. The MS identification method includes transmitting a ranging request message including a hashed Medium Access Control (MAC) address to a Base Station (BS), for initial ranging, and receiving a ranging response message including a temporary station Identifier (ID) from the BS. The temporary station ID is used to provide security to a MAC address or station ID by which the BS uniquely identifies the MS.

15 Claims, 9 Drawing Sheets

METHOD FOR IDENTIFYING MOBILE STATION

This application is the National Phase of PCT/KR2009/006415 filed on Nov. 3, 2009, which claims priority under 35 USC 119 (e) to U.S. Provisional Application No. 61/110,911 filed Nov. 3, 2008, and under 35 USC 119 (a) to Application Nos. 10-2009-0016280 filed in The Republic of Korea on Feb. 26, 2009 and 10-2009-0080523 filed in The Republic of Korea on Aug. 28, 2009. All of the above applications are hereby incorporated by reference into the present application.

TECHNICAL FIELD

The present invention relates to a data transmission and reception method for ensuring privacy and security in a wireless access system and more particularly, to a method for identifying a Mobile Station (MS), while protecting the location privacy of the MS.

BACKGROUND ART

A typical encryption method will be described below in brief.

Encryption is a technology that ensures the confidentiality of data by intentionally distorting the data at a transmitter and a receiver during communication. In a general encryption procedure, the transmitter encrypts plaintext to ciphertext by use of a predetermined encryption key and transmits the ciphertext to the receiver. The receiver translates the ciphertext into the plaintext by decryption. In this manner, the transmitter and the receiver may encrypt voice packets and/or data packets to ensure the security of communication between them.

There are two types of encryption: symmetric key encryption and asymmetric key encryption.

An encryption scheme that uses the same key for encrypting and decrypting information is called symmetric key encryption. Hence, a symmetric encryption algorithm uses the same key (a shared secret key) for encryption at the transmitter and for decryption at the receiver.

Asymmetric key encryption is an encryption scheme that uses different keys for encryption and decryption, that is, a public key for encryption at the transmitter and a secret key (or private key) for decryption at the receiver. The public key is made public to third parties, whereas the secret key is kept secret between the transmitter and the receiver. For asymmetric key encryption, a public key-based structure or a public key encryption scheme, such as Rivest, Shamir and Adleman (RSA) or the like, may be referred to.

A brief description will be made below of a typical network entry procedure of an MS.

The MS may acquire synchronization to a Base Station (BS) by scanning a downlink channel from the BS. Also, the MS may acquire transmission parameters from an Uplink Channel Descriptor (UCD). Now the MS is able to perform initial ranging with the BS.

After the ranging procedure, the MS may negotiate Subscriber Station (SS) basic capabilities with the BS. The BS may authorize the MS to conduct communication and exchange encryption keys with the MS in an authentication procedure. In this manner, the MS may register to the BS.

DISCLOSURE

Technical Problem

In the general ranging procedure, a Medium Access Control (MAC) address identifying the MS may be used unprotected. Therefore, the MAC address may be subject to abuse from a malicious attacker in a service that the BS will provide to the MS later.

For example, location privacy is to provide security to a unique MAC address assigned to an MS and/or a Station Identifier (ST ID) identifying the MS within a BS.

Location privacy breach refers to an attacker's active or passive attack against the IDs of an MS. The location privacy breach ranges widely from simple eavesdropping of an ID of an MS (e.g. a MAC address, an MS ID, etc.) and a BS ID exchanged between a network and the MS to a variety of later attacks based on the ID of the MS.

However, if the MAC addresses, MS IDs and/or ST IDs of MSs are not used to protect the location privacy of the MSs, it is difficult for the BS to distinguish a plurality of MSs.

For example, if the BS cannot distinguish a plurality of MSs from one another, it may have difficulty in identifying the individual MSs when the MSs transmit ranging codes for network entry to the BS.

An object of the present invention devised to solve the problem lies on a communication method for ensuring privacy and security during network entry of an MS.

Another object of the present invention devised to solve the problem lies on a method for overcoming the location privacy problem that the MAC address of an MS is disclosed.

Another object of the present invention devised to solve the problem lies on a method for protecting an ST ID by which a BS uniquely identifies an MS, that is, a method for supporting location privacy to prevent disclosure of location information about a user (e.g. an MS) to a malicious attacker.

Another object of the present invention devised to solve the problem lies on a method for protecting an ID of an MS against a disclosure threat by enabling an MS to use a temporary ID in an initial ranging procedure for network entry until before an authentication procedure is completed.

Another object of the present invention devised to solve the problem lies on a method for identifying each MS in a BS, when the location privacy of the MS is ensured.

Another object of the present invention devised to solve the problem lies on a method for supporting the location privacy of an MS by transmitting a hashed MAC address (e.g. AMSID*) of the MS to a BS, instead of a MAC address of the MS.

Another object of the present invention devised to solve the problem lies on a method for using a hashed MAC address of an MS (e.g. AMSID*) in generating keying materials after an authentication procedure by transmitting the hashed MAC address of the MS to a BS.

A further object of the present invention devised to solve the problem lies on a method for reducing the overhead of a key agreement procedure by not directly transmitting a hashed MAC address from an MS to a BS in the key agreement procedure, that is, a method for generating a hashed MAC address (e.g. AMSID*) of an MS by transmitting only a parameter (NONCE_MS) needed for generation of the hashed MAC address from an MS to a BS.

It will be appreciated by persons skilled in the art that the objects that could be achieved with the present invention are not limited to what has been particularly described hereinabove and the above and other objects that the present invention could achieve will be more clearly understood from the following detailed description taken in conjunction with the accompanying drawings.

Technical Solution

The objects of the present invention can be achieved by providing a data transmission and reception method for ensuring privacy and security and a method for identifying an MS, while ensuring the location privacy of the MS in a wireless access system.

In an aspect of the present invention, provided herein is a method for identifying an MS, when location privacy of the MS is supported, includes transmitting a ranging request message including a hashed MAC address to a BS, for initial ranging, and receiving a ranging response message including a temporary ST ID from the BS. The temporary ST ID may be used to provide security to a MAC address or ST ID by which the BS uniquely identifies the MS. The hashed MAC address may be generated using the MAC address and a Cyclic Redundancy Check (CRC) function.

The temporary ST ID may be valid until an authentication procedure is completed between the MS and the BS. Or the temporary ST ID may be valid until before the ST ID is allocated by setting encryption keys.

The method may further include negotiating a location privacy support level between the MS and the BS.

The method may further include receiving a MAP message for allocating resources from the BS, and the MAP message may be transmitted using the temporary ST ID.

The hashed MAC address may be determined to be the remainder of dividing the MAC address by a CRC function.

In another aspect of the present invention, provided herein is a method for identifying an MS, when location privacy of the MS is supported, includes receiving a ranging request message including a hashed MAC address from the MS, for initial ranging, and transmitting a ranging response message including a temporary ST ID to the MS. The temporary ST ID may be used to provide security to a MAC address or ST ID by which a BS uniquely identifies the MS. The hashed MAC address may be generated using the MAC address and a CRC function.

The temporary ST ID may be valid until an authentication procedure is completed between the MS and the BS. Or the temporary ST ID may be valid until before an authentication procedure is completed and the station ID is allocated.

The method may further include negotiating a location privacy support level between the MS and the BS.

The method may further include transmitting a MAP message for allocating resources to the MS, and the MAP message may be transmitted using the temporary ST ID. The hashed MAC address may be generated using the MAC address and a CRC function.

In another aspect of the present invention, provided herein is a method for identifying an MS, when location privacy of the MS is supported, includes transmitting a ranging request message including a hashed MAC address to a BS, for initial ranging, and receiving a ranging response message including a temporary ST ID from the BS. The temporary ST ID may be used to provide security to mapping information about a MAC address or ST ID by which the BS uniquely identifies the MS. The hashed MAC address may be generated using an MS ID, a BS ID, and an MS nonce.

The temporary ST ID may be valid until an authentication procedure is completed between the MS and the BS. Or the temporary ST ID may be valid until before the ST ID is allocated by setting encryption keys.

The method may further include negotiating a location privacy support level between the MS and the BS. The method may further include receiving a MAP message for allocating resources from the BS, and the MAP message may be transmitted using the temporary ST ID.

In another aspect of the present invention, provided herein is a method for identifying an MS, when location privacy of the MS is supported, includes receiving a ranging request message including a hashed MAC address from the MS, for initial ranging, and transmitting a ranging response message including a temporary ST ID to the MS. The temporary ST ID may be used to provide security mapping information about a MAC address or ST ID by which a BS uniquely identifies the MS. The hashed MAC address may be generated using an MS ID, a BS ID and an MS nonce.

The temporary ST ID may be valid until an authentication procedure is completed between the MS and the BS. Or the temporary ST ID may be valid until before an authentication procedure is completed and the station ID is allocated.

The method may further include negotiating a location privacy support level between the MS and the BS. The method may further include transmitting a MAP message for allocating resources to the MS, and the MAP message may be transmitted using the temporary ST ID.

In a further aspect of the present invention, provided herein is an MS for supporting location privacy, including an antenna for transmitting and receiving messages, a transmission module for controlling the transmission of the messages through the antenna, a reception module for controlling the reception of the messages through the antenna, and a processor for controlling the transmission module and the reception module. The processor may be adapted to transmit a ranging request message including a hashed MAC address to a BS, for initial ranging, and receive a ranging response message including a temporary ST ID from the BS, and the temporary ST ID may be used to provide security to a MAC address or ST ID by which the BS uniquely identifies the MS.

The hashed MAC address MAY BE generated based on one or more of an ID of the MS, an ID of the BS and a nonce of the MS. The temporary ST ID may be valid until an authentication procedure is completed between the MS and the BS. Or the temporary station ID may be valid until before the ST ID is allocated by setting encryption keys.

The MS may negotiate a location privacy support level with the BS. The MS may also receive a MAP message for resource allocation from the BS through the reception module, and the MAP message may be transmitted using the temporary station ID.

It will be appreciated by persons skilled in the art that the objects that could be achieved with the present invention are not limited to what has been particularly described hereinabove and the above and other objects that the present invention could achieve will be more clearly understood from the following detailed description taken in conjunction with the accompanying drawings.

Advantageous Effects

Exemplary embodiments of the present invention have the following effects.

During network entry, an MS can maintain its privacy and security.

The location privacy problem that the MAC address of an MS is disclosed can be overcome.

Protection of the ST ID of an MS prevents the disclosure of location information about the MS to a malicious attacker.

During an initial ranging procedure, an MS uses a temporary ID until an authentication procedure is completed. Therefore, the ID of the MS (or the MAC address of the MS) can be protected against disclosure threats.

A location privacy support level is negotiated beforehand between an MS and a BS and the ID of the MS is not transmitted directly through a radio interface. Therefore, the risk of disclosing the ID of the MS and/or the ST ID of the MS to malicious attackers is prevented until before an authentication procedure is completed.

Even though the location privacy of an MS is protected according to the exemplary embodiments of the present invention, a BS can identify the MS. Specifically, the MAC address of the MS is protected against disclosure because instead of the MAC address of the MS, a MAC address hash value obtained by computing a Cyclic Redundancy Check (CRC) on the MAC address of the MS is included in a certificate.

The MAC address of an MS is protected against disclosure since not the MAC address of the MS but the hashed MAC address (AMSID*) of the MS is exchanged between the MS and a BS in an authentication procedure.

A BS can generate the hashed MAC address (AMSID*) of an MS based on a nonce of the MS (NONCE_MS) received from the MS in a key agreement procedure. Accordingly, there is no need for delivering the hashed MAC address (AMSID*) of the MS by a key agreement message.

As an MS transmits only its nonce (NONCE_MS) to a BS so that the BS may generate the hashed MAC address (AMSID*) of the MS based on the nonce, rather than it transmits its hashed MAC address (AMSID*) directly to the BS in a key agreement procedure, the overhead of the key agreement procedure can be reduced. Because the BS can generate the hashed MAC address (AMSID*) of the MS based on the nonce of the MS (NONCE_MS), the MS does not need to directly transmit the hashed MAC address (AMSID*) to the BS in the key agreement procedure.

After an authentication procedure with an MS, a BS can generate keying materials using the hashed MAC address (AMSID*) of the MS.

It will be appreciated by persons skilled in the art that that the effects that could be achieved with the present invention are not limited to what has been particularly described hereinabove and the above and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

In the drawings.

MODE FOR INVENTION

Figure 1:
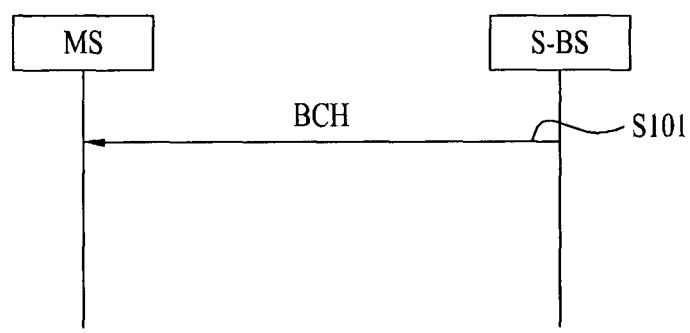
FIG. 1 illustrates a method for negotiating a location privacy level, which is applicable to exemplary embodiments of the present invention.

The present invention relates to a wireless access system. The present invention provides a data transmission and reception method for ensuring privacy and security in a wireless access system. The present invention also provides methods for identifying a Mobile Station (MS), while protecting the location privacy of the MS.

Exemplary embodiments described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment.

In the description of drawings, procedures or steps, which may ruin the substance of the present invention, are not explained. And, procedures or steps, which can be understood by those skilled in the art, are not explained as well.

In exemplary embodiments of the present invention, a description is made of a data transmission and reception relationship between a Base Station (BS) and an MS. Herein, the term 'BS' refers to a terminal node of a network, which communicates directly with the MS. In some cases, a specific operation described as performed by the BS may be performed by an upper node of the BS.

Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'eNode B (eNB)', 'access point', etc. The term 'MS' may be replaced with the term 'User Equipment (UE)', 'Subscriber Station (SS)', 'Mobile Subscriber Station (MSS)', 'mobile terminal', 'terminal', etc.

A transmitter means a node that transmits voice or data service and a receiver means a node that receives voice or data service. Hence, an MS may be a transmitter and a BS may be a receiver, on uplink. Likewise, the MS may be a receiver and the BS may be a transmitter, on downlink.

Meanwhile, the MS may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS)

phone, a hand-held PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.)

Exemplary embodiments of the present invention may be achieved by various means, for example, hardware, firmware, software, or a combination thereof.

In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the exemplary embodiments of the present invention may be implemented in the form of a module, a procedure, a function, etc. performing the above-described functions or operations. A software code may be stored in a memory unit and executed by a processor. The memory unit is located at the interior or exterior of the processor and may transmit and receive data to and from the processor via various known means.

Exemplary embodiments of the present invention are supported by standard documents disclosed for at least one of wireless access systems including an Institute of Electrical and Electronics Engineers (IEEE) 802 system, a $3^{rd}$ Generation Project Partnership (3GPP) system, a 3GPP Long Term Evolution (LTE) system, and a 3GPP2 system. In particular, the steps or parts, which are not described to clearly reveal the technical idea of the present invention, in the embodiments of the present invention may be supported by the above documents. All terminologies used herein may be supported by at least one of P802.16-2004, P802.16e-2005, and P802.16Rev2 documents which are the standards of IEEE 802.16.

Now a detailed description will be made of preferred embodiments of the present invention with reference to the accompanying drawings. The following detailed description presented with reference to the accompanying drawings is intended to describe not the only embodiment of the present invention but exemplary embodiments of the present invention.

Specific terms used for the embodiments of the present invention are provided to help the understanding of the present invention. These specific terms may be replaced with other terms within the scope and spirit of the present invention.

Methods for Protecting Location Privacy

FIG. 1 illustrates a method for negotiating a location privacy level, which is applicable to exemplary embodiments of the present invention.

Referring to FIG. 1, an MS may negotiate a location privacy support level with a Serving BS (S-BS) in step S101. More specifically, the S-BS may negotiate the location privacy with the MS on a periodically transmitted Broadcast Channel (BCH).

The BCH may carry privacy level information indicating whether only an MS Identifier (ID) (or a Medium Access Control (MAC) address), a Station ID (STID) identifying an MS uniquely in a BS, a paging ID, or a combination of some of them is protected.

In exemplary embodiments of the present invention, regarding a MAC address, location privacy may be protected using a temporary ID, and regarding an ST ID (a BS ID), location privacy is protected using a temporary ST ID. The temporary ID and the temporary ST ID may be used until an authentication procedure is completed.

Figure 2:
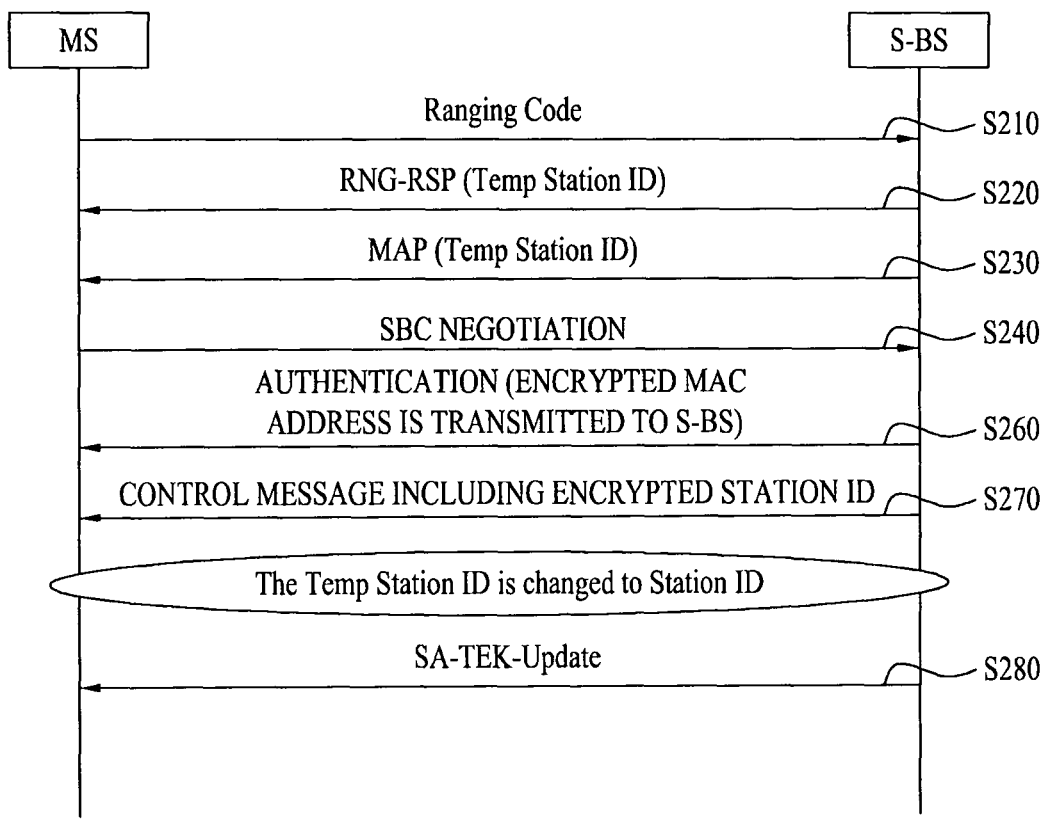
FIG. 2 is a diagram illustrating a signal flow for a method for supporting location privacy using a temporary Station IDentifier (ST ID) according to an exemplary embodiment of the present invention.

FIG. 2 is a diagram illustrating a signal flow for a method for supporting location privacy using a temporary ST ID according to an exemplary embodiment of the present invention.

Preferably, the location privacy supporting method illustrated in FIG. 2 is performed after the location privacy level negotiation procedure illustrated in FIG. 1.

Referring to FIG. 2, an MS transmits a ranging code to an S-BS, for initial network entry in step S210.

The S-BS may transmit a Ranging Response (RNG-RSP) message including a temporary ST ID to the MS in step S220. That is, the S-BS may allocate the temporary ST ID to the MS in order to protect the location privacy of the MS.

In step S230, the S-BS may transmit a MAP message including the temporary ST ID to the MS. That is, the S-BS may allocate radio resources to the MS using the temporary ST ID.

The MS and the BS may carry out an SS Basic Capability (SBC) negotiation procedure using the temporary ST ID in step S240. For example, the MS may transmit a Subscriber Station Basic Capability Request (SBC-REQ) message to the S-BS and the S-BS may transmit a Subscriber Station Basic Capability Response (SBC-RSP) message to the MS, to thereby perform the SBC negotiation procedure.

The temporary ST ID may be valid at the S-BS and the MS until an authentication procedure is completed. Therefore, the MAC address of the MS and/or the BS may be encrypted during the authentication procedure in step S250.

When the S-BS successfully authenticates the MS, it may transmit a control message including an encrypted ST ID to the MS in step S260.

Because encryption keys are set to support privacy at the MS and the S-BS after the successful authentication procedure, the MS and the BS may use the ST ID instead of the temporary ST ID. Subsequently, the S-BS may update a Traffic Encryption Key (TEK) used for Security Association (SA) with the MS. For this purpose, the S-BS may transmit a Security Association Traffic Encryption Key (SA-TEK) Update message to the MS in step S270.

Figure 3:
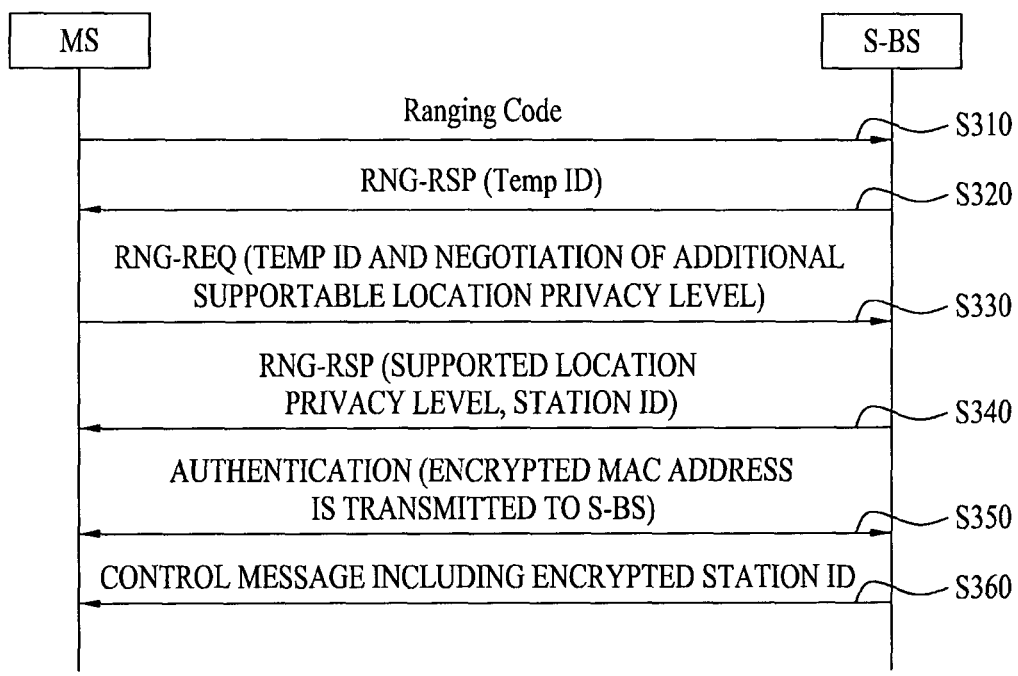
FIG. 3 is a diagram illustrating a signal flow for a method for supporting location privacy using a temporary ID according to an exemplary embodiment of the present invention.

FIG. 3 is a diagram illustrating a signal flow for a method for supporting location privacy using a temporary ID according to an exemplary embodiment of the present invention.

Basically, an S-BS may support location privacy to protect the MAC address of an MS, when it provides a service to the MS. In this case, the S-BS may use a temporary ID instead of the MAC address of the MS during initial ranging, for protecting the location privacy of the MS.

Referring to FIG. 3, the MS may transmit a ranging code as a ranging request message to the S-BS, for initial ranging with the S-BS in step S310.

The S-BS may reply to the MS with an RNG-RSP message including a temporary ID in step S320.

Upon receipt of the RNG-RSP message including the temporary ID, the MS may be aware that the S-BS basically supports the location privacy of the MS. To negotiate additional protection of an ST ID or a paging ID with the S-BS, the MS may transmit an RNG-REQ message in step S330.

In step S330, the MS may transmit the temporary ID (instead of its MAC address) and privacy level information for negotiating an additionally supportable location privacy level to the S-BS by the RNG-REQ message.

The S-BS may transmit an RNG-RSP message including information about its supported location privacy level to the MS in step S340. Herein, the S-BS may notify the MS that it protects the ST ID additionally.

If the initial ranging is successful, the S-BS and the MS may perform an authentication procedure. The MS and the S-BS may encrypt their MAC addresses used in the authentication procedure. Until before encryption keys are set, the S-BS and the MS may transmit and receive messages using the temporary ID even in the authentication procedure in step S350.

In step S360, the S-BS may transmit a control message including an encrypted ST ID to the MS.

Figure 4:
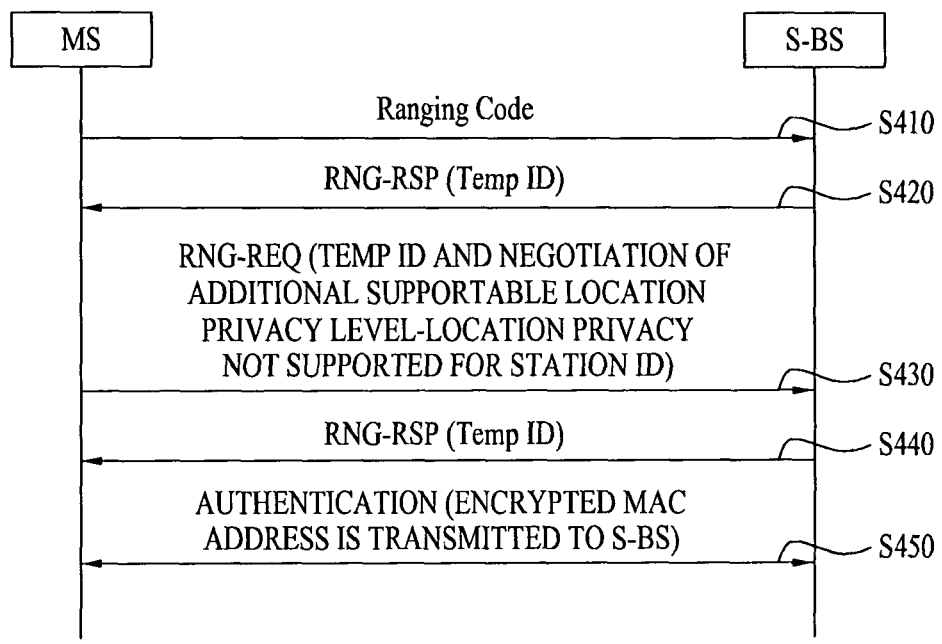
FIG. 4 is a diagram illustrating a signal flow for a method for supporting location privacy using a temporary ID according to another exemplary embodiment of the present invention.

FIG. 4 is a diagram illustrating a signal flow for a method for supporting location privacy using a temporary ID according to another exemplary embodiment of the present invention.

Basically, an S-BS may support location privacy to protect the MAC address of a MS, when it provides a service to the MS. In this case, the S-BS may transmit an RNG-RSP message including a temporary ID instead of the MAC address of the MS during initial ranging.

Referring to FIG. 4, the MS may transmit a ranging code as a ranging request message to the S-BS, for initial ranging with the S-BS in step S410.

The S-BS may reply to the MS with an RNG-RSP message including a temporary ID instead of an MS ID or a MAC address to support the location privacy of the MS in step S420.

Upon receipt of the RNG-RSP message including the temporary ID, the MS may be aware that the S-BS basically supports the location privacy of the MS. To negotiate additional protection of an ST ID or a paging ID with the S-BS, the MS may transmit an RNG-REQ message in step S430.

In step S430, the MS may transmit the temporary ID and privacy level information for negotiating an additionally supportable location privacy level to the S-BS by the RNG-REQ message. Herein, it is assumed that the S-BS does not support location privacy regarding the ST ID.

Therefore, the S-BS may transmit an RNG-RSP message including the temporary ID to the MS in step S440.

If the initial ranging is successful, the S-BS and the MS may perform an authentication procedure. The MS and the S-BS may encrypt their MAC addresses used in the authentication procedure. Until before encryption keys are set, the S-BS and the MS may transmit and receive messages using the temporary ID even in the authentication procedure in step S450.

After the authentication procedure, the S-BS may allocate radio resources to the MS using the ST ID. That is, the MS may be allocated radio resources using the ST ID.

Figure 5:
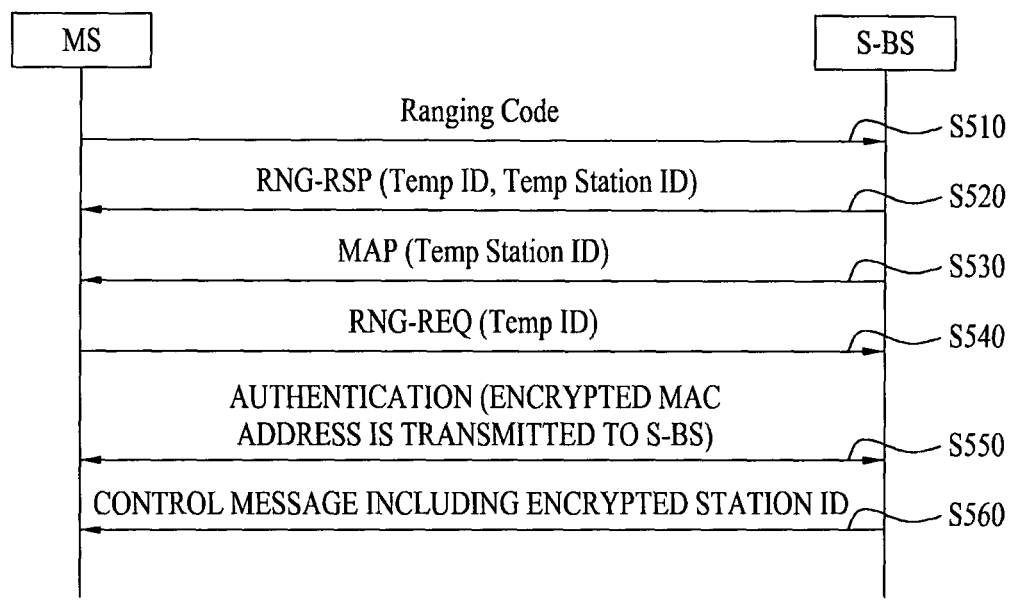
FIG. 5 is a diagram illustrating a signal flow for a method for supporting location privacy using a temporary ID and a temporary ST ID according to an exemplary embodiment of the present invention.

FIG. 5 is a diagram illustrating a signal flow for a method for supporting location privacy using a temporary ID and a temporary ST ID according to an exemplary embodiment of the present invention.

Referring to FIG. 5, an MS may transmit a ranging code to an S-BS, for initial ranging with the S-BS in step S510.

The S-BS may allocate a temporary ID to the MS to protect the MAC address or ID of the MS and a temporary ST ID to the MS to protect an ST ID that uniquely identifies the MS in the S-BS. Accordingly, the S-BS may transmit an RNG-RSP message including the temporary ID and the temporary ST ID to the MS in step S520.

The S-BS may allocate radio resources to the MS using the temporary ST ID. Thus, the S-BS may transmit a MAP message including the temporary ST ID to the MS in step S530.

In accordance with the exemplary embodiment of the present invention, the temporary ID and the temporary ST ID may be valid at the S-BS and the MS until before an authentication procedure is successfully completed and encryption keys are generated. In other words, before the authentication procedure, the temporary ID and the temporary ST ID may be used to provide privacy and security to signals or messages transmitted between the MS and the S-BS.

The MS may transmit an RNG-REQ message including the temporary ID allocated by the S-BS to the S-BS in step S540.

After the initial ranging is successful, the S-BS and the MS may perform an authentication procedure. The MS and the S-BS may encrypt their MAC addresses used in the authentication procedure. Until before encryption keys are set, the S-BS and the MS may transmit and receive messages using the temporary ID even in the authentication procedure in step S550.

When the authentication procedure is successful, the S-BS may transmit a control message including an encrypted ST ID to the MS in step S560.

In the exemplary embodiments of the present invention, encrypted MAC addresses may be exchanged between the MS and the S-BS during the authentication procedure in progress.

After the authentication procedure, the S-BS may allocate radio resources to the MS using the ST ID.

MS Identification Methods

A detailed description will be made below of methods for identifying an MS when the location privacy of the MS is supported.

With reference to FIGS. 1 to 5, the methods for protecting the location privacy of an MS have been described. One thing to note herein is that if MSs transmit the same ranging code to a BS by RNG-REQ messages, the BS may not allocate different temporary ST IDs to the different MSs.

Accordingly, there exists a need for a method for overcoming the afore-mentioned MS identification problem that may be caused by collision between ranging codes, when the location privacy of MSs is protected.

It may be contemplated as an exemplary embodiment of the present invention that the MS transmits a MAC address hash instead of its MAC address to the BS in a ranging procedure for network entry. For instance, the MS may generate a MAC address hash out of its MAC address by a CRC-24 function. Then the MS may transmit the MAC address hash to the BS. The BS may identify the MS by the MAC address hash.

Figure 6:
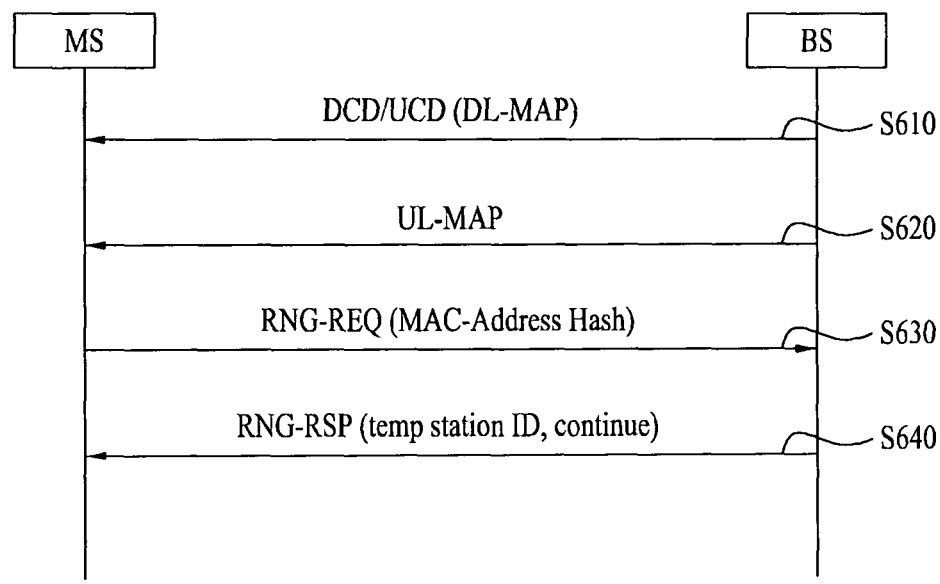
FIG. 6 is a diagram illustrating a signal flow for a method for identifying a Mobile Station (MS) in the case where the location privacy of the MS is ensured according to an exemplary embodiment of the present invention.

FIG. 6 is a diagram illustrating a signal flow for a method for identifying an MS in the case where the location privacy of the MS is ensured according to an exemplary embodiment of the present invention.

A BS and an MS may transmit and receive control messages to perform an initial network entry procedure.

Referring to FIG. 6, the BS may transmit a DownLink MAP (DL-MAP) message to the MS. Also, the BS may periodically transmit a Downlink Channel Descriptor (DCD) and/or an Uplink Channel Descriptor (UCD) in a downlink burst indicated by the DL-MAP message to the MS in step S610.

Upon receipt of the DL-MAP message, the MS may acquire synchronization to the BS in a MAC layer. The MS may maintain synchronization to one BS from which the MS has received a DL-MAP message and/or a DCD message.

After the synchronization with the MS, the BS may transmit to the MS a UL-MAP message including a set of transmission parameters used to support an uplink channel available to the MS in step S620. That is, the BS may notify the MS of information about the uplink channel resources by the UL-MAP message.

After receiving the UL-MAP message (and/or the UCD message) from the BS, the MS may perform initial ranging with the BS. The initial ranging may be carried out by exchanging an RNG-REQ message and an RNG-RSP message between the MS and the BS.

In step S630, the MS may include a MAC address hash obtained by computing the CRC-24 function on a 48-bit MAC address of the MS, instead of the MAC address, in the RNG-REQ message.

The MS may use a smaller-size CRC function than the CRC-24 function, such as CRC-8, CRC-16, etc. in order to reduce the size of the RNG-REQ message in step S630. For example, the MAC address hash may be defined as the remainder of dividing the MAC address by the CRC function. To further reduce the probability of collision between MAC address hashes, the use of parallel CRC functions may be considered.

There is a low probability that the same MAC address hash value is generated out of different MAC addresses in step S630. Thus, RNG-REQ messages are not likely to collide with each other. A CRC function may be also applicable to the MAC address of an MS that is to be included in a certificate. As the MAC address hash of the MS, not the MAC address of the MS, is included in an IEEE 802.16m certificate, the MAC address of the MS may be protected against disclosure.

Referring to FIG. 6 again, upon receipt of the RNG-REQ message including the MAC address hashes of the MS, the BS may identify the MS by the MAC address hash. Therefore, the BS may allocate a temporary ST ID to the MS and transmit an RNG-RSP message including the temporary ST ID to the MS in step S640.

Figure 7:
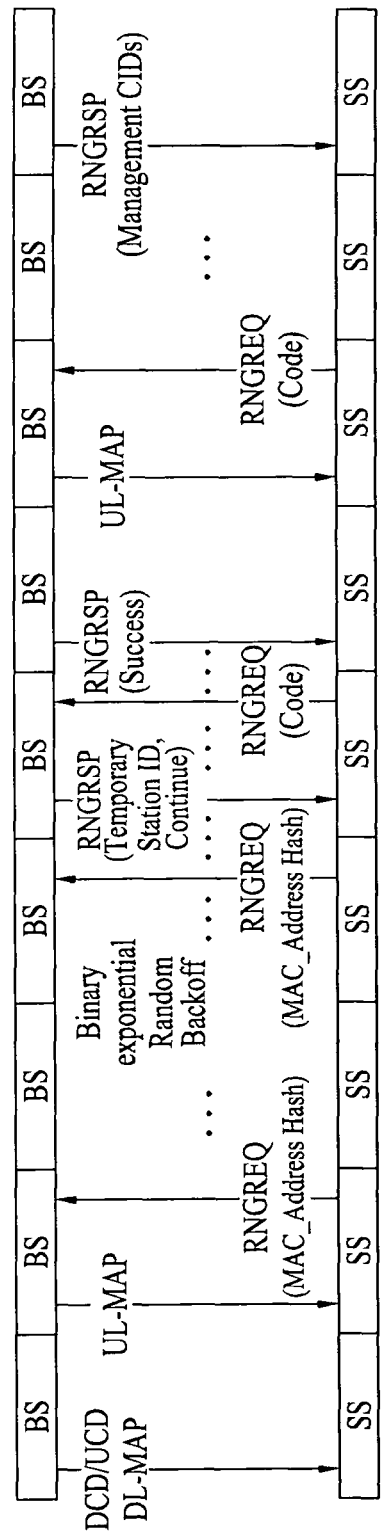
FIG. 7 illustrates a method for identifying an MS when the location privacy of the MS is protected according to another exemplary embodiment of the present invention.

FIG. 7 illustrates a method for identifying an MS when the location privacy of the MS is protected according to another exemplary embodiment of the present invention.

Referring to FIG. 7, a BS may transmit a DL-MAP message, a DCD, and/or a UCD to an MS. Upon receipt of the DL-MAP message, the MS may acquire synchronization to the BS in a MAC layer. The MS may maintain its synchronization to one BS from which the MS has received DL-MAP and DCD messages.

After the synchronization with the MS, the BS may notify the MS of uplink channel information by transmitting a UL-MAP message including a set of transmission parameters used for supporting an uplink channel available to the MS.

After receiving the UCD and/or UL-MAP message from the BS, the MS may perform an initial ranging procedure with the BS. The initial ranging may be carried out by exchanging an RNG-REQ message and an RNG-RSP message between them.

For the initial ranging with the BS, the MS may transmit an RNG-REQ message including its MAC address hash to the BS. If the ranging request is failed, the MS may attempt the initial ranging a predetermined time later.

The BS may transmit an RNG-RSP message to the MS in response to the RNG-REQ message. To support the location privacy of the MS, the BS may include a temporary ST ID in the RNG-RSP message, instead of an ST ID that uniquely identifies the MS.

When the initial ranging is successful, the MS transmits an RNG-REQ message including its MAC address to the BS and the BS may reply to the MS with an RNG-RSP message including a Management Connection IDentifier (MCID).

Figure 8:
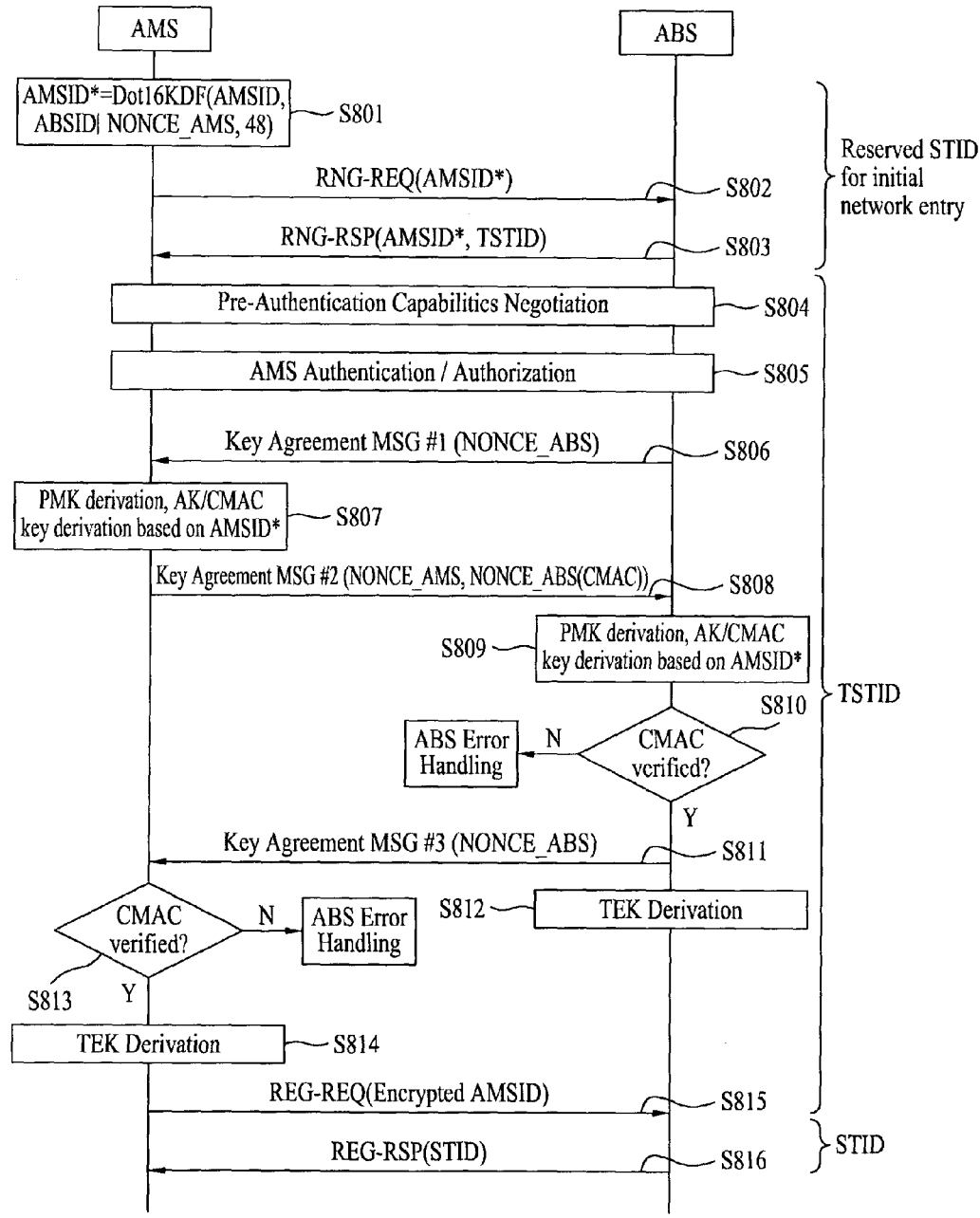
FIG. 8 is a diagram illustrating a signal flow for a method for supporting the location privacy of an MS using a hashed MAC address of the MS according to an exemplary embodiment of the present invention.

FIG. 8 is a diagram illustrating a signal flow for a method for supporting the location privacy of an MS using a hashed MAC address of the MS according to an exemplary embodiment of the present invention.

An Advanced BS (ABS) may allocate a temporary ST ID (or TSTID) to an Advanced MS (AMS) to support the location privacy of the AMS. If a specific AMS transmits a ranging code identical to that of another AMS in an RNG-REQ message to the ABS, the ABS may not allocate different temporary ST IDs (or STIDs) to different AMSs. That is, collision may occur between ranging codes.

The MS identification method illustrated in FIG. 8 is intended to solve an MS identification-related problem that may be encountered with a ranging code collision resulting from an ABS's allocation of temporary ST IDs to AMSs to protect the location privacy of the AMSs.

In FIG. 8, the AMS may compute a hashed MAC address (AMSID*) by a Dot16KDF function and transmit the hashed MAC address instead of its MAC address to the ABS in a ranging procedure for network entry. The ABS may easily identify the AMS by the hashed MAC address.

If the AMS wants to protect its MAC address irrespective of a location privacy support level, it may transmit a 48-bit hashed MAC address (AMSID*) obtained by computing the Dot16KDF function on a 48-bit MAC address to the ABS, instead of the MAC address. There is a low probability that AMSID* values collide with each other for different MAC addresses, that is, that the same AMSID* value is created for different MAC addresses. Therefore, the problem that the ABS cannot identify AMSs due to a ranging code collision is mitigated to some extent.

Referring to FIG. 8, the AMS may compute a hashed MAC address (AMSID*) by computing the Dot16KDF function over an AMS ID (AMSID), an ABS ID (ABSID), and an AMS nonce (NONCE_AMS) in step S801.

The following equation describes a method for calculating a 48-bit hashed MAC address (AMSID*).

$$\text{AMSID*} = \text{Dot16KDF(AMSID, ABSID|NONCE\_AMS,48)} \quad \text{[Equation 1]}$$

where NONCE_AMS is a random number generated by the AMS. It may be generated before the AMS transmits an AAA_RNG-REQ message to the ABS.

In step S802, the AMS may transmit an RNG-REQ message including the hashed MAC address to the ABS.

The ABS may transmit to the AMS an RNG-RSP message including a temporary ST ID allocated to the AMS in response to the RNG-REQ message in step S803. The RNG-RSP message may further include the hashed MAC address (AMSID*).

The temporary ST ID is temporarily available before an ST ID is allocated. The AMS and the ABS negotiate security capabilities for authentication in a pre-authentication capabilities negotiation procedure in step S804 and perform an authentication procedure in step S805.

When the authentication procedure is successfully completed, the AMS and the ABS start a key agreement procedure.

The AMS may receive an ABS nonce (NONCE_ABS) from the ABS by a first key agreement message, Key Agreement MSG #1 in step S806.

The AMS may Derive a 160-bit Pairwise Master Key (PMK) from the AMS nonce (NONCE_AMS) created during the ranging procedure and a Master Key (MSK) resulting from the authentication. NONCE_ABS is a nonce generated in the ABS during the key agreement. The AMS and the ABS may create keying materials by the key agreement. In step S807, the AMS generates keying materials including a PMK, an Authorization Key (AK), and a Cipher-based Message Authentication Code (CMAC).

The PMK may be derived as follows.

$$PMK=Dot16KDF(MSK, NONCE\_AMS|NONCE\_ABS|\text{``PMK''},160) \quad \text{[Equation 2]}$$

Referring to Equation 2, the PMK may be derived by computing the Dot16KDF function over the MSK, NONCE_AMS, and NONCE_ABS.

Equation 3 describes a method for deriving a 160-bit AK from the PMK.

$$AK=Dot16KDF(PMK, AMSID^*|BSID|CMAC\_KEY\_COUNT|\text{``AK''}, 160) \quad \text{[Equation 3]}$$

As noted from Equation 3, the AK may be created using the PMK, AMSID*, BSID, and CMAC_KEY_COUNT. CMAC_KEY_COUNT is identical to CMAC_KEY_COUNT defined in the P802.16e standard.

The AMS also creates CMAC keys by $$CMAC\_KEY\_U|CMAC\_KEY\_D=Dot16KDF(AK, \text{``CMAC\_KEYS''},256) \quad \text{[Equation 4]}$$

Referring to Equation 4, the AMS may generate two 128-bit CMAC keys, CMAC_KEY_U and CMAC_KEY_D for use in an uplink and a downlink, respectively, based on the AK and a CMAC key.

Subsequently, the AMS may transmit a second key agreement message, Key Agreement MSG #2 to the ABS in step S808.

At the step of S808, the Key Agreement MSG #2 includes NONCE_ABS and NONCE_AMS and may be protected with a CMAC. NONCE_ABS may be identical to NONCE_ABS that was received from ABS in Key Agreement MSG #1 and NONCE_AMS may be newly generated by the AMS in step S801 or in the ranging procedure.

Upon receipt of Key Agreement MSG #2, the ABS may generate AMSID* in the same manner as the AMS. Also, the BS may create a PMK, an AK, and a CMAC key in the same manner as the AMS by Equation 1 to Equation 4 in step S809.

When the ABS generates the CMAC key, it may verify the integrity of Key Agreement MSG #2, that is, it may determine whether the CMAC value of Key Agreement MSG #2 is valid in step S810. If the CMAC value is invalid, the ABS may perform an error handling operation. If the CMAC value is valid, the ABS may transmit a third key agreement message, Key Agreement MSG #3 including at least one of NONCE_AMS, NONCE_ABS, and Security Association Identifiers (SAIDs) to the AMS in step S811.

In step S812, the ABS may generate a Transmission Encryption Key (TEK) by the following equation.

$$TEK=Dot16KDF(AK, SAID|COUNTER\_TEK|\text{``TEK''},128)) \quad \text{[Equation 5]}$$

In the exemplary embodiment of the present invention, the sequence of steps S811 and S812 may be changed. Specifically, the TEK generation in the ABS may precede the transmission of Key Agreement MSG #3 from the ABS to the AMS.

The AMS verifies the CMAC value of Key Agreement MSG #3 using the previously created CMAC key in step S813. If the CMAC value is invalid, the AMS may perform an AMS error handling operation. If the CMAC is valid, the AMS may derive a TEK by Equation 5 in step S814.

When the TEK setting is completed, the AMS may transmit its MAC address to the ABS safely, which is possible by encryption of a Registration Request (REG-REQ) message including the MAC address of the AMS (or the ID of the AMS (AMSID)). Thus the AMS may transmit the encrypted REG-REQ message to the ABS in step S815.

Similarly, the ABS may transmit an ST ID to the AMS safely, which is possible by encrypting a Registration Response (REG-RSP) message including the ST ID. Thus the ABS may transmit the encrypted REG-RSP message to the AMS in step S816.

As stated before, NONCE_AMS may be delivered from the AMS to the ABS during the key agreement. Hence, the ABS may generate AMSID* using NONCE_AMS. This means that the AMS ID (AMSID*) need not be transmitted from the AMS to the ABS during the key agreement. The AK and the CMAC key are derived from AMSID* in the authentication procedure.

Figure 9:
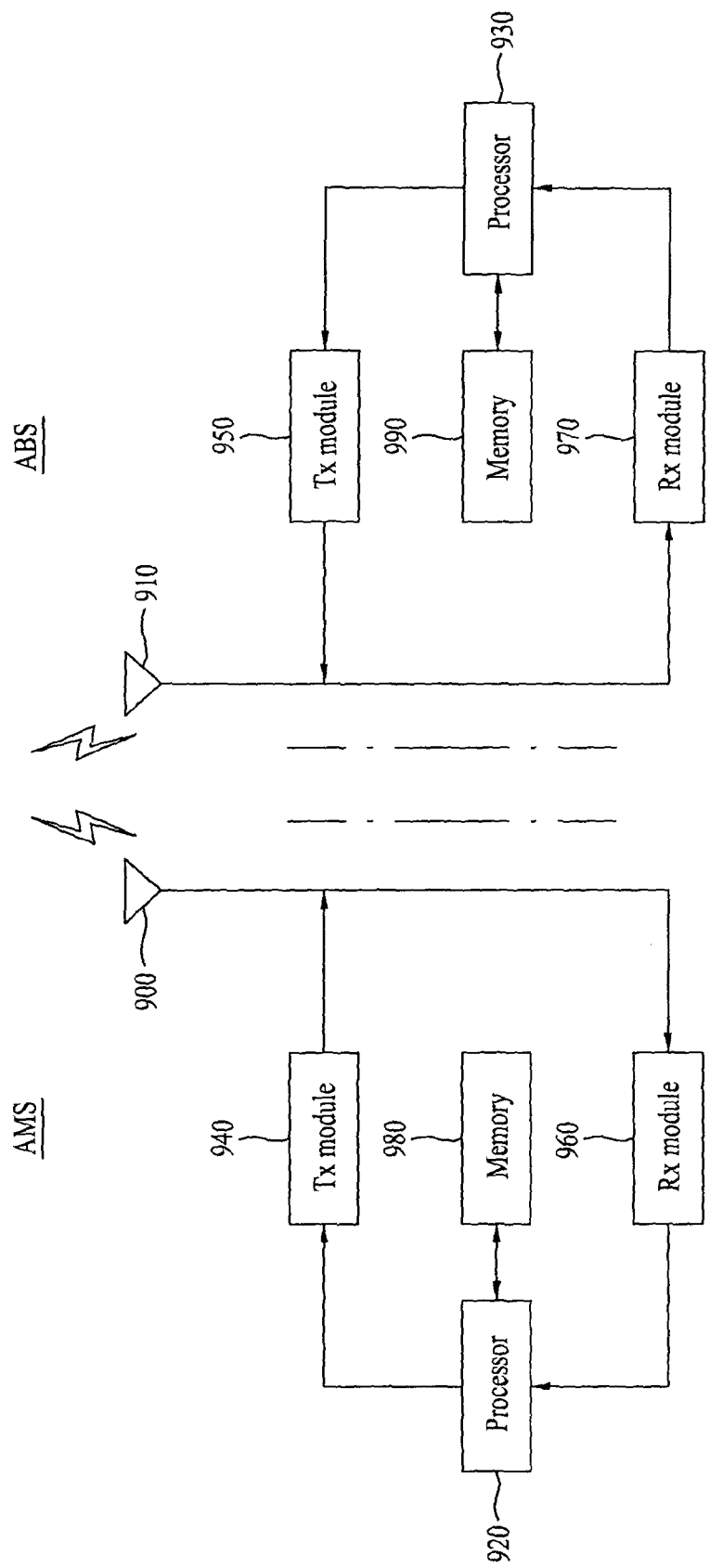
FIG. 9 is a block diagram of an MS and a Base Station (BS) for implementing the exemplary embodiments of the present invention described with reference to FIGS. 1 to 8, according to an exemplary embodiment of the present invention.

FIG. 9 is a block diagram of an MS and a BS for implementing the exemplary embodiments of the present invention described with reference to FIGS. 1 to 8, according to an exemplary embodiment of the present invention.

Referring to FIG. 9, an AMS and an ABS include antennas 900 and 910 for transmitting and receiving information, data, signals and/or messages, Transmission (Tx) modules 940 and 950 for transmitting messages by controlling the antennas 900 and 910, Reception (Rx) modules 960 and 970 for receiving messages by controlling the antennas 900 and 910, memories 980 and 990 for storing information related to communication between the AMS and the ABS, and processors 920 and 930 for controlling the Tx modules 940 and 950, the Rx modules 960 and 970, and the memories 980 and 990.

The antennas 900 and 910 transmit signals generated from the Tx modules 940 and 950 to the outside, receive external radio signals, and provide them to the Rx modules 960 and 970. If Multiple Input Multiple Output (MIMO) is supported, two or more antennas may be provided.

The processors 920 and 930 generally provide overall control to the AMS and the ABS, respectively. Especially, the processors 920 and 930 may perform a control function for implementing the above-described exemplary embodiments of the present invention, a variable MAC frame control function based on service characteristics and a propagation environment, a handover function, an authentication and encryption function, etc.

The processors 920 and 930 may also include encryption modules for controlling encryption of various messages. For example, the AMS and the ABS may perform the methods described with reference to FIGS. 1 to 8 using the processors 920 and 930 and the encryption modules of the processors 920 and 930.

The Tx modules 940 and 950 may encode and modulate transmission data scheduled by the processors 920 and 930 in a predetermined coding and modulation scheme and provide the modulated data to the antennas 900 and 910.

The Rx modules 960 and 970 may recover original data by demodulating and decoding data received through the antennas 900 and 910 and provide the recovered data to the processors 920 and 930.

The memories 980 and 990 may store programs for processing and control of the processors 1202 and 1203 and temporarily store input/output data (on the side of the AMS, an uplink grant, system information, an ST ID, a Flow ID (FID), an action time, resource area assignment information, and frame offset information, etc. received from the ABS).

Each of the memories 980 and 990 may include at least one of storage media types such as a flash memory type, a hard disk type, a multimedia card micro type, a card-type memory (e.g. a Secure Digital (SD) or extreme Digital (XD) memory), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disk, an optical disk, etc.

Functions of the AMS and the ABS may be described below in detail.

The AMS may generate a hashed MAC address (AMSID*), compute a nonce (e.g. NONCE_AMS), and generate a PMK, an AK, and a CMAC through the processor 920. Also, the AMS may encrypt messages for communication with the ABS through the encryption module of the processor 920 and transmits the encrypted messages to the ABS through the Tx module 940. The ABS may calculate a nonce (e.g. NONCE_ABS) and generate a PMK, an AK and a CMAC at the processor 930. Also, the ABS may encrypt messages for communication with the AMS through the encryption module of the processor 930 and transmit the encrypted messages to the AMS through the Tx module 950.

That is, the AMS and the ABS may perform their own functions in the procedures illustrated in FIGS. 1 to 8 through the afore-mentioned components.

Meanwhile, the MS (or AMS) may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a hand-held PC, a laptop PC, a smart phone, a Multi Mode-Multi Band (MM-MB) terminal, etc.

Exemplary embodiments of the present invention may be achieved by various means, for example, hardware, firmware, software, or a combination thereof.

In a hardware configuration, the methods according to the exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the exemplary embodiments of the present invention may be implemented in the form of a module, a procedure, a function, etc. performing the above-described functions or operations. A software code may be stored in the memories 980 and 990 and executed by the processors 920 and 930. The memories 980 and 990 are located at the interior or exterior of the processors 920 and 930 and may transmit and receive data to and from the processors 920 and 930 via various known means.

[Industrial Applicability]

The exemplary embodiments of the present invention are applicable to various wireless access systems including a 3GPP system, a 3GPP2 system, and/or an IEEE 802.xx system. Besides these wireless access systems, the exemplary embodiments of the present invention are applicable to all technical fields in which the wireless access systems find their applications.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents. Also, it is obvious to those skilled in the art that claims that are not explicitly cited in each other in the appended claims may be presented in combination as an exemplary embodiment of the present invention or included as a new claim by a subsequent amendment after the application is filed.

The invention claimed is:

1. A method for identifying a Mobile Station (MS) and supporting location privacy of the MS, the method performed by the MS and comprising:
    transmitting a ranging request message configured to be used for an initial ranging during a network entry procedure, the ranging request message including a hashed Medium Access Control (MAC) address; and
    receiving a ranging response message including a temporary station Identifier (ID) in response to the ranging request message, the temporary station ID corresponding to the hashed MAC address,
    wherein the temporary station ID is used to provide security to a MAC address of the MS by which a base station (BS) uniquely identifies the MS, and
    wherein the hashed MAC address is generated from the MAC address of the MS by using a Cyclic Redundancy Checking (CRC) function.

2. The method according to claim 1, wherein the temporary station ID is valid until an authentication procedure is completed between the MS and the BS.

3. The method according to claim 1, wherein the temporary station ID is valid until before the station ID is allocated by setting encryption keys.

4. The method according to claim 1, further comprising:
    negotiating a location privacy support level between the MS and the BS.

5. The method according to claim 1, further comprising:
    receiving a MAP message for allocating resources from the BS, wherein the MAP message is transmitted using the temporary station ID.

6. A method for identifying a Mobile Station (MS) and supporting location privacy of the MS, the method performed by a base station (BS) and comprising:
    receiving a ranging request message configured to be used for an initial ranging during a network entry procedure, the ranging request message including a hashed Medium Access Control (MAC) address from the MS; and
    transmitting a ranging response message including a temporary station Identifier (ID) in response to the ranging request message, the temporary station ID corresponding to the hashed MAC address,
    wherein the temporary station ID is used to provide security to a MAC address of the MS by which the BS uniquely identifies the MS, and
    wherein the hashed MAC address is generated from the MAC address of the MS by using a Cyclic Redundancy Checking (CRC) function.

7. The method according to claim 6, wherein the temporary station ID is valid until an authentication procedure is completed between the MS and the BS.

8. The method according to claim 6, wherein the temporary station ID is valid until before an authentication procedure is completed and the station ID is allocated.

9. The method according to claim 6, further comprising negotiating a location privacy support level between the MS and the BS.

10. The method according to claim 6, further comprising transmitting a MAP message for allocating resources to the MS, wherein the MAP message is transmitted using the temporary station ID.

11. A Mobile Station (MS) for supporting location privacy, the MS comprising:
- an antenna for transmitting and receiving messages;
- a transmission module for controlling the transmission of the messages through the antenna;
- a reception module for controlling the reception of the messages through the antenna; and
- a processor for controlling the transmission module and the reception module, wherein the processor is configured to:
- transmit, to a base station (BS), a ranging request message configured to be used for an initial ranging during a network entry procedure, the ranging request message including a hashed Medium Access Control (MAC) address, and
- receive, from the BS, a ranging response message including a temporary station Identifier (ID) in response to the ranging request message, the temporary station identifier corresponding to the hashed MAC address,
- wherein the temporary station ID is used to provide security to a MAC address of the MS by which the BS uniquely identifies the MS, and
- wherein the hashed MAC address is generated from the MAC address of the MS by using a Cyclic Redundancy Checking (CRC) function.

12. The MS according to claim 11, wherein the temporary station ID is valid until an authentication procedure is completed between the MS and the BS.

13. The MS according to claim 11, wherein the temporary station ID is valid until before the station ID is allocated by setting encryption keys.

14. The MS according to claim 11, wherein the MS negotiates a location privacy support level with the BS.

15. The MS according to claim 11, wherein the MS receives a MAP message for resource allocation from the BS through the reception module, the MAP message being transmitted using the temporary station ID.

* * * * *